United States Patent [19]

Choi

[11] Patent Number: 5,915,064
[45] Date of Patent: Jun. 22, 1999

[54] METHOD AND APPARATUS FOR AUTOMATICALLY RECOGNIZING RECORDING TIME FOR TIME-LAPSE VIDEOCASSETTE RECORDER

[75] Inventor: Hae-Yong Choi, Sungnam, Rep. of Korea

[73] Assignee: SamSung Electronics Co., Ltd., Suwon, Rep. of Korea

[21] Appl. No.: 09/013,187

[22] Filed: Jan. 26, 1998

[30] Foreign Application Priority Data

Jan. 31, 1997 [KR] Rep. of Korea ......................... 97-2965

[51] Int. Cl.[6] ..................................................... H04N 5/76
[52] U.S. Cl. .............................. 386/46; 386/117; 386/67; 348/159
[58] Field of Search .............................. 386/46, 117, 107, 386/68, 121, 67, 80, 81; 348/159, 153; 358/906; H04N 5/76, 5/765

[56] References Cited

U.S. PATENT DOCUMENTS

| | | | |
|---|---|---|---|
| 4,001,881 | 1/1977 | Folsom | 386/117 |
| 4,633,335 | 12/1986 | Yamamoto et al. | 386/121 |
| 5,396,378 | 3/1995 | Yokoyama . | |
| 5,530,421 | 6/1996 | Marchall et al. . | |
| 5,615,017 | 3/1997 | Choi | 386/117 |
| 5,680,499 | 10/1997 | Choi . | |

*Primary Examiner*—Huy T. Nguyen
*Attorney, Agent, or Firm*—Robert E. Bushnell, Esq.

[57] ABSTRACT

An apparatus for automatically recognizing recording time of a time-lapse recorder (TLV) in a closed circuit television (CCTV) system is provided. The automatic TLV-recording time recognizing apparatus includes: a buffer for restoring attenuation of a trigger pulse signal output from the TLV and removing noise of the trigger pulse signal to improve signal driving capability; a mono-stable multivibrator for detecting the trigger pulse signal from a signal output from the buffer and performing a retrigger function; a pulse cycle comparator for comparing the cycle of the trigger pulse signal output from the buffer with a predetermined reference value; and a recording mode determiner for determining the recording mode of the connection switching device corresponding to the recording time of the TLV based on the output data of the mono-stable multivibrator and the pulse cycle comparator. Therefore, each recording time in the normal and emergency states is programed in only the TLV, so that a connection switcher automatically outputs a signal corresponding to the current state of the TLV, thereby providing accuracy in the system and convenience in the use of the system.

17 Claims, 2 Drawing Sheets

METHOD AND APPARATUS FOR AUTOMATICALLY RECOGNIZING RECORDING TIME FOR TIME-LAPSE VIDEOCASSETTE RECORDER

CLAIM OF PRIORITY

This application makes reference to, incorporates the same herein, and claims all benefits accruing under 35 U.S.C. §119 arising from an application for a *Method And Apparatus For Automatically Recognizing Recording Time For Time-lapse Videocassette Recorder* earlier filed in the Korean Industrial Property Office on Jan. 31, 1997 and there duly assigned Serial No. 2965/1997.

FIELD OF THE INVENTION

The present invention pertains to time-lapse videocassette recording (TLV) for a closed circuit television (CCTV), and more particularly, to a method and apparatus for automatically programming whether intermittent or continuous mode is being utilized.

DESCRIPTION OF THE RELATED ART

U.S. Pat. No. 5,680,499 for a *Time-Lapse Video Cassette Recorder* to Choi discloses a video cassette recorder that can record for either a twelve hour or a twenty-four hour duration by varying the film speed. A video cassette recorder may need to vary the duration of recording for a two hour tape from two hours to ninety-six hours. As is too often the case, a connection switching device in addition to the time-lapse videocassette recorder must be separately programmed by the user when the user wishes to change the duration of recording for a 2 hour tape. I have found that contemporary designs fail to enable a user of a time-lapse videocassette recorder to just program the time-lapse videocassette recorder when changing the duration of recording for a short duration (e.g., a two hour) recording medium.

SUMMARY OF THE INVENTION

It is therefore an object to provide an improved method and apparatus for fixing images on a recording medium such as a videocassette or a digital video disk (DVD).

It is also an object to provide an automatic recording time recognizing apparatus and method for a time-lapse videocassette recorder (TLV), in which each recording time in the normal and emergency states is set by program in only the TLV and a connection switching apparatus automatically outputs a signal corresponding to each mode.

It is yet another object to provide a time-lapse videocassette recorder that automatically programs the connection switching apparatus as to the duration of recording for a two-hour tape.

It is also yet another object to provide a connection switching apparatus that automatically determines whether or not the time-lapse videocassette recorder is operating in intermittent mode or continuous mode.

It is still yet another object to provide a simple method for programming an image forming apparatus the duration and mode of operation for the time-lapse image forming apparatus.

It is also another object to prevent user inconvenience of having to set multiple times the mode or time of recording in a time-lapse recording apparatus, It is also yet another object to prevent the misoperation of a time-lapse recording device due to the erroneous setting of the mode or time.

To achieve these and other objects there is provided an automatic time-lapse videocassette recorder that sends out a trigger pulse to a buffer circuit. The buffer circuit restores attenuation and removes noise from the trigger pulse signal and inputs the restored trigger pulse signal into both a mono-stable multivibrator and pulse cycle comparator. The mono-stable multivibrator detects the time constant of the trigger pulse and the pulse cycle comparator detects the pulse width of the restored trigger pulse. The mono-stable multivibrator and the pulse cycle comparator output a logic signal that is input to a recording mode determiner. The recording mode determiner operates as an AND gate and decides the recording mode of the time-lapse videocassette recorder. The output of the recording mode determiner is input into the connection switching device to program the connection switching device as to the duration and mode of the time-lapse videocassette recorder.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
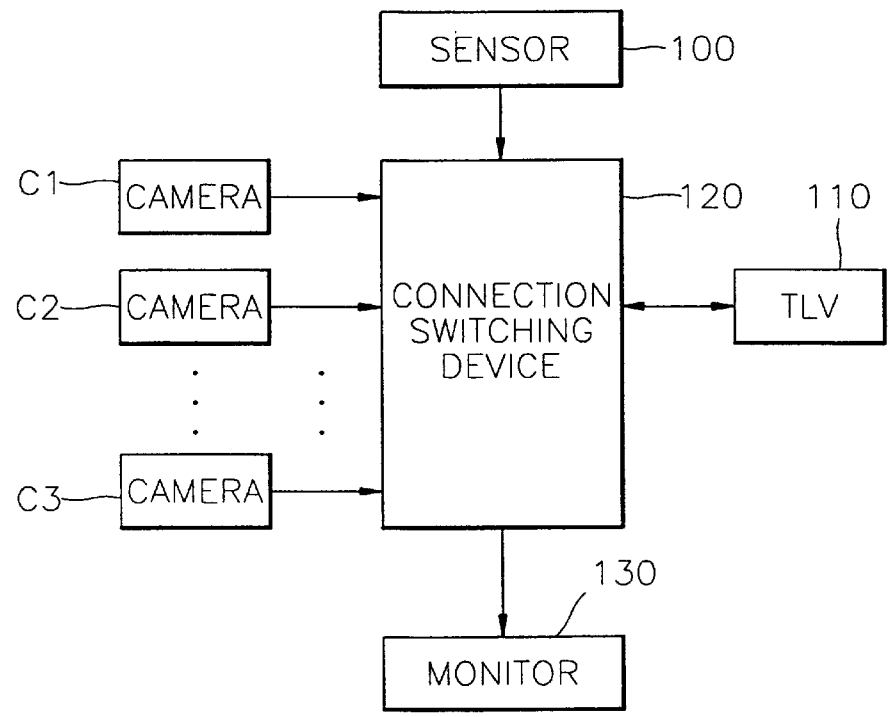
FIG. 1 is a diagram showing the structure of a general closed circuit television (CCTV) system.

FIG. 1 is a block diagram of a general CCTV. The CCTV includes a plurality of cameras (C1, C2, ..., CN), a sensor 100 for sensing external status, a TLV 110 for intermittently recording signals from the cameras, and a connection switching device 120 for connecting one of the plural camera signals to the TLV. The signals picked up in the cameras can be displayed on a monitor 130 via the connection switching device 120. Likewise, the signals recorded in the TLV 110 are played back and then displayed on the monitor 130 via the connection switching device 120. As shown in FIG. 1, in the CCTV system in which a plurality of apparatuses are connected, a recording for a duration between 12 hours and 960 hours in the TLV is called an intermittent recording mode, and a recording for 12 hours or less, for example, 2, 3, 6 or 8 hours, in the TLV is called a general recording mode.

In general, the TLV is set to perform an intermittent recording for 72 hours using a 2-hour length recording tape in a normal state, and a general recording under an emergency (alarm) state depending upon the output from a sensor. Although the length of the tape is usually two hours, the principles of the present invention can be applied to tapes of other lengths. In addition, the present invention is not limited to videocassettes, but may pertain to digital video disks (DVD) and any other recording medium. Also, a frame switcher or a multiplexer as a connection switching apparatus to the TLV is set to perform the intermittent recording mode under the normal state and the general recording mode under the emergency state. Here, the same recording mode and status as those in the TLV are set in the connection switching apparatus.

In summary, in the conventional CCTV system, a program for setting a recording mode to be the intermittent recording mode or the general recording mode, at the normal and emergency states should be set in the TLV and the connection switcher, separately, such that the recording by the TLV is performed under the same recording mode and state as those set to the connection switcher. That is, each program is manually set in both the TLV and the connection switcher.

Figure 2:
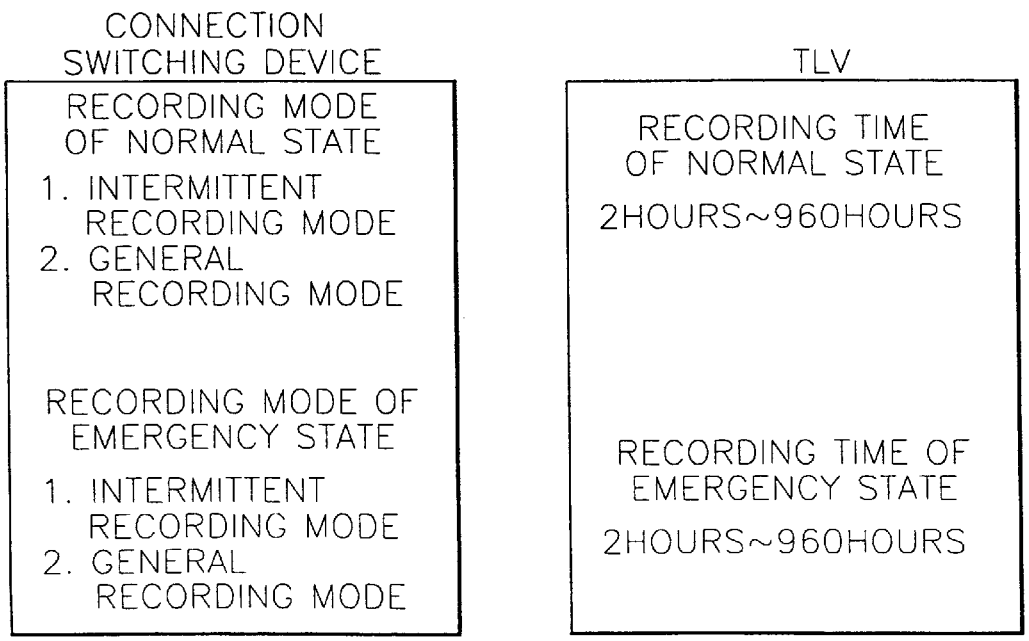
FIG. 2 is a diagram showing items to be set in a connection switching apparatus and a time-lapse videocassette recorder (TLV) in a conventional CCTV system.

FIG. 2 shows items to be set in the TLV and the connection switching apparatus in a conventional CCTV system.

As shown in FIG. 2, an intermittent recording mode (12 hours or more) and a general recording mode (2~12 hours) are set in the connection switching apparatus according to the states while the recording time ranging from 2 hour to 960 hours (which may be different based on models) is set in the TLV irrespective of the recording mode.

Here, a program for setting each recording state should be set in the TLV and the connection switching apparatus, separately, by a user. Also, only recording time is set in the TLV without classification of the recording mode such as the intermittent recording mode or the general recording mode, resulting in much inconvenience causing many incorrect operations. That is, there is an inconvenience in that the recording mode or time each for the normal and emergency states should be set in the TLV and the connection switching apparatus, respectively, by a user. Also, the recording may be performed abnormally depending upon the incorrect operation related to the setting of mode or time.

The concept of an automatic TLV-recording time recognizing apparatus according to the present invention will be described. A time-lapse videocassette recorder (TLV) outputs a trigger signal for switching of a signal in a connection switching apparatus. Since the trigger signal is output by one at a starting point in time of recording during an intermittent recording mode, a pulse interval increases in proportion to the recording time. Various kinds of TLVs manufactured by many manufacturers have been on sale, in which the trigger pulse signal is not output, or output in a $1/60$ second or $1/30$ second cycle during a general recording mode. Also, the trigger pulse signal is output at a cycle of $3/50$ seconds at minimum and 8 seconds at maximum during an intermittent recording mode. However, according to the present invention, if a recording time for the normal state and a recording time for the emergency state are set in the TLV, a connection switching apparatus automatically determines whether a trigger signal exists or not, or compares the cycles of pulse signals, thereby making a determination of the recording mode in the connection switching device. Accordingly, the connection between the TLV and the connection switching apparatus is smoothly performed.

Figure 3:
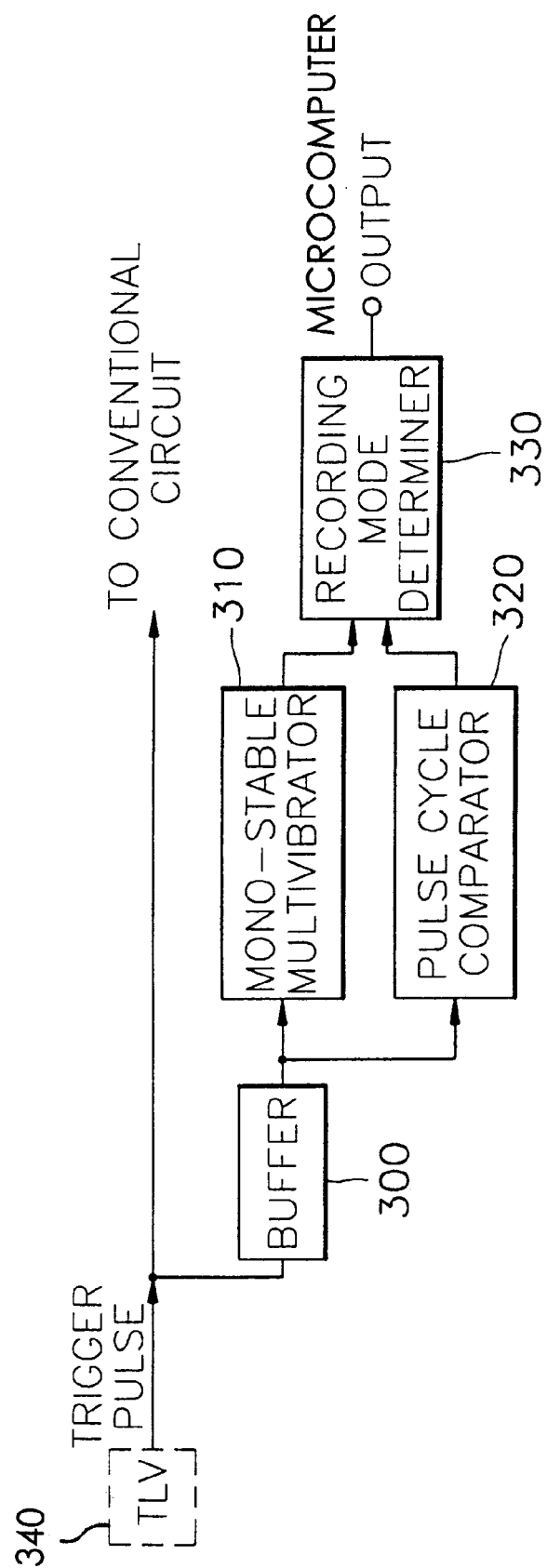
FIG. 3 is a block diagram showing the structure of an automatic recording time recognizing apparatus for a TLV according to a preferred embodiment of the present invention.

FIG. 3 is a block diagram showing the structure of the automatic TLV-recording time recognizing apparatus according to a preferred embodiment of the present invention. The automatic TLV-recording time recognizing apparatus of FIG. 3 includes a buffer 300, a mono-stable multivibrator 310, a pulse cycle comparator 320 and a recording mode determiner 330. The buffer 300 restores attenuation of a trigger pulse output from a TLV or removes noise of the trigger pulse to improve signal driving capability.

The mono-stable multivibrator 310 continuously responds to successive input pulses, detects a trigger signal from the signal output from the buffer 300 using the successive input pulses, and performs a retrigger function. Also, the mono-stable multivibrator 310 is designed such that the output thereof is maintained in a "high" state with respect to the input pulse while being a "low" state when a pulse is not continuously input within the range of a predetermined time constant ($\tau = kRC \cong 8.5$ sec).

The pulse cycle comparator 320 compares the cycle of the trigger signal output from the buffer 300 with a predetermined reference value, e.g., $3/50$ seconds, to determine the recording mode of the connection switching device corresponding to the recording time of the TLV. As a result, if the cycle of the trigger signal is greater than or equal to $3/50$ second, the output from the pulse cycle comparator 320 is in a logic high. On the contrary, if the cycle of the trigger signal is less than $3/50$ seconds, the output from the pulse cycle comparator 320 is in a logic low.

The recording mode determiner 330 determines the recording mode by combining the output data of the mono-stable multivibrator 310 and the pulse cycle comparator 320, which is comprised of a logic circuit outputting the results shown in Table 1. Here, a logic low output represents the general recording mode, and a logic high output represents the intermittent recording mode.

TABLE 1

| output of mono-stable multivibrator | output of pulse cycle comparator | output of recording mode determiner |
|---|---|---|
| low | low | low |
| low | high | low |
| high | low | low |
| high | high | high |

A TLV 340 used in the present invention does not output a trigger signal, or outputs a successive trigger signal with a cycle of $1/60$ second or $1/30 \sim 1/25$ second during the general recording mode of the recording time of 2~8 hours according to a program set thereto. Also, the TLV 340 outputs a trigger signal with a cycle of $3/50 \sim 8$ seconds during the intermittent recording mode of the recording time of 12~960 hours.

Next, the operation of the automatic TLV-recording time recognizing apparatus according to the present invention will be described.

First, the buffer 300 receives a trigger pulse output from the TLV 340 and buffers the trigger pulse for the following processing. Also, the buffer 300 improves the driving capability of the next blocks and protects the next blocks from noise of the trigger pulse input from the TLV 340. When the pulse signal passed through the buffer 300 is input to the mono-stable multivibrator 310, the output of the mono-stable multivibrator 310 is maintained in a "high" state. However, when a pulse signal is not input within the range of a predetermined time constant of about 8.5 seconds, the output of the mono-stable multivibrator 310 becomes in a "low" state. Then, the signal output from the mono-stable multivibrator 310 is input to the recording mode determiner 330.

Meanwhile, the output of the buffer 300 is also input to the pulse cycle comparator 320. The pulse cycle comparator 320 compares the cycle of successive input pulses with a predetermined reference value, e.g., $3/50$ seconds. As a result, if the cycle of the input pulse is greater than or equal to $3/50$ seconds, a logic high signal is output, and otherwise, a logic low signal is output.

Then, the output signals of the mono-stable multivibrator 310 and the pulse cycle comparator 320 are input to the recording mode determiner 330 to determine the recording mode based on the logic of Table 1. Also, the output of the recording mode determiner 330 is input to a microcomputer or other logic circuits to automatically change the recording mode of the connection switching apparatus according to the set recording time of the TLV, from an intermittent recording mode to a general recording mode and vice versa.

According to the automatic TLV-recording time recognizing apparatus of the present invention, each recording time in the normal and emergency states is programed in only the TLV, so that a connection switcher automatically outputs a signal corresponding to the current state of the TLV, thereby providing accuracy to the system and convenience in the use of the system. The present invention includes a method for programming a closed circuit television system, comprising the steps of: selectively operationally connecting different ones of a plurality of cameras generating video images to a time-lapse recorder storing said video images in a sequence on a recording medium; programming said time-lapse recorder by selecting a duration of recording said video images onto the recording medium for a first length of recording tape; automatically programming a connection switching device with said duration of recording, wherein said connection switching device connects said plurality of cameras to said time-lapse recorder; automatically determining a mode of operation based on said duration of recording; outputting a signal specifying said mode of operation from said connection switching device to said time-lapse recorder; and providing a buffer, a mono-stable multivibrator, a pulse cycle comparator, and a recording mode determiner, wherein said step of automatically programming said connection switching device with said duration of recording further comprises the steps of: inputting a trigger pulse signal from said time-lapse recorder into said buffer; outputting a restored trigger pulse signal from said buffer into said mono-stable multivibrator and from said buffer into said pulse cycle comparator; outputting a logic level signal from said pulse cycle comparator based on a cycle of said restored trigger pulse signal; and outputting a logic level signal from said mono-stable multi vibrator based on a time constant of said restored trigger pulse signal; and inputting said logic level signal output from said mono-stable multivibrator and said logic level signal output from said pulse cycle comparator into said recording mode determiner to program said connection switching device with said duration of recording. Additionally, the present invention includes a closed circuit television system, comprising: a plurality of cameras; a time-lapse recorder, a connection switching device connected between said plurality of cameras and said time-lapse recorder, selectively operationally connecting different ones of said plurality of cameras generating video images to said time-lapse recorder storing said video images in sequence on a recording medium, said connection switching device being automatically programmed by said time-lapse recorder upon entry of a recording duration into said time-lapse recorder, a buffer that receives a trigger pulse from said time-lapse recorder and restores said trigger pulse; a pulse cycle comparator that receives the restored trigger pulse from said buffer and outputs a logic signal based on the duration of the trigger pulse; a mono-stable multivibrator that receives the restored trigger pulse from said buffer and outputs a logic signal based on the time constant of said restored trigger pulse; a recording mode determiner that receives the logic signals from said mono-stable multivibrator and said pulse cycle comparator and alerts said connection switching device of said recording duration of said time-lapse recorder, a first means automatically duration a mode of operation based on said recording duration of said time-lapse recorder; and a second means outputting a signal specifying said mode of operation from said connection switching device to said time-lapse recorder.

What is claimed is:

1. A closed circuit television system, comprising:
    a plurality of cameras;
    a time-lapse recorder;
    a connection switching device connecting said plurality of cameras to said time-lapse recorder;
    a buffer restoring attenuation of a trigger pulse signal output from said time-lapse recorder and filtering the trigger pulse signal to improve signal driving capability, said buffer having an input and an output, said input receiving said trigger pulse signal output from said time-lapse recorder, said output outputting the restored trigger pulse signal;
    a mono-stable multivibrator detecting said restored trigger pulse signal from said output of said buffer, said mono-stable multivibrator performing a retrigger function, said mono-stable multivibrator having an input and an output, said input being connected to said output of said buffer;
    a pulse cycle comparator comparing the cycle of the restored trigger pulse signal output from the buffer with a predetermined reference value, said pulse cycle comparator having an input and an output, said input being connected to said output of said buffer; and
    a recording mode determiner determining the recording mode of the connection switching device corresponding to the recording time of the time-lapse recorder based on the output signal of said mono-stable multivibrator and the output signal of said pulse cycle comparator.

2. The closed circuit television system of claim 1, said recording mode determiner performing the function of an AND gate outputting a logic high signal only when both said output signal of said mono-stable multivibrator and said output signal of said pulse cycle comparator are both logic high, said logic high signal indicating intermittent recording mode and a logic low signal indicating continuous recording mode.

3. The closed circuit television system of claim 1, said pulse cycle comparator outputs a logic low signal when said restored trigger pulse signal of said buffer has a cycle of less than a first interval of time, and said pulse cycle comparator outputs a logic high signal when said restored trigger pulse signal of said buffer has a cycle of greater than said first interval of time.

4. The closed circuit television system of claim 1, said mono-stable multivibrator outputs a logic level high when said restored trigger pulse signal of said buffer has a time constant of a second interval of time, and outputs a logic level low when said restored trigger pulse signal of said buffer does not have a time constant of said second interval of time.

5. A method for programming a closed circuit television system, comprising the steps of:
    selectively operationally connecting different ones of a plurality of cameras generating video images to a time-lapse recorder storing said video images in a sequence on a recording medium;
    programming said time-lapse recorder by selecting a duration of recording said video images onto the recording medium for a first length of recording tape;

automatically programming a connection switching device with said duration of recording, wherein said connection switching device connects said plurality of cameras to said time-lapse recorder;

automatically determining a mode of operation based on said duration of recording;

outputting a signal specifying said mode of operation from said connection switching device corresponding to current state of said time-lapse recorder; and providing a buffer, a mono-stable multivibrator, a pulse cycle comparator, and a recording mode determiner, wherein said step of automatically programing said connection switching device with said duration of recording further comprises the steps of:

inputting a trigger pulse signal from said time-lapse recorder into said buffer;

outputting a restored trigger pulse signal from said buffer into said mono-stable multivibrator and from said buffer into said pulse cycle comparator;

outputting a logic level signal from said pulse cycle comparator based on a cycle of said restored trigger pulse signal; and outputting a logic level signal from said mono-stable multivibrator based on a time constant of said restored trigger pulse signal; and inputting said logic level signal output from said mono-stable multivibrator and said logic level signal output from said pulse cycle comparator into said recording mode determiner to program said connection switching device with said duration of recording.

6. The method of claim 5, wherein said recording mode determiner performs a function of an AND logic gate, and said recording mode determiner outputs a logic level high signal only when both said logic level signal output from said pulse cycle comparator and said logic level signal output from said mono-stable multivibrator correspond to a logic high, said logic level high signal being output from said recording mode determiner corresponding to an intermittent recording mode, and a logic level low signal being output from said recording mode determiner corresponding to a continuous recording mode.

7. A closed circuit television system, comprising:

a plurality of cameras;

a time-lapse recorder;

a connection switching device connected between said plurality of cameras and said time-lapse recorder, selectively operationally connecting different ones of said plurality of cameras generating video images to said time-lapse recorder storing said video images in sequence on a recording medium, said connection switching device being automatically programmed by said time-lapse recorder upon entry of a recording duration into said time-lapse recorder;

a buffer that receives a trigger pulse from said time-lapse recorder and restores said trigger pulse;

a pulse cycle comparator that receives the restored trigger pulse from said buffer and outputs a logic signal based on the duration of the restored trigger pulse;

a mono-stable multivibrator that receives the restored trigger pulse from said buffer and outputs a logic signal based on the time constant of said restored trigger pulse; and a recording mode determiner that receives the logic signals from said mono-stable multivibrator and said pulse cycle comparator and programs said connection switching device of said recording duration of said time-lapse recorder.

8. The closed circuit television system of claim 7, said recording mode determiner automatically determining a mode of operation based on said recording ration of said time-lapse recorder, and said connection switching device outputting a signal specifying said mode of operation from said connection switching device corresponding to current state of said time-lapse recorder.

9. The closed circuit television system of clam 7, said recording mode determiner performing the function of an AND gate, and said recording mode determiner outputting a logic high signal only when both said logic signal of said mono-stable multivibrator and said logic signal of said pulse cycle comparator are logic high.

10. The closed circuit television system of claim 9, the output of said recording mode determiner corresponding to a high logic level when said time-lapse recorder is in intermittent mode, and said output of said recording mode determiner being at a low logic level when said time-lapse recorder is in a continuous mode.

11. The closed circuit television system of claim 7, said pulse cycle comparator outputs a logic level low signal when said restored trigger pulse outputted from said buffer has a cycle corresponding to a primary interval of time, said primary interval of time being less than a predetermined interval of time, and said pulse cycle comparator outputs a logic level high signal when said restored trigger pulse outputted from said buffer has a cycle corresponding to a secondary interval of time, said secondary interval of time being greater than said predetermined interval of time.

12. The closed circuit television system of claim 11, said predetermined interval of time corresponding to a ⅗₀th of a second.

13. The closed circuit television system of claim 7, said mono-stable multivibrator outputs a logic level low signal when said restored trigger pulse outputted from said buffer is not continuously input to said mono-stable multivibrator during a predetermined quantity of time, and outputs a logic level high signal when not outputting said logic level low signal.

14. The closed circuit television system of claim 13, said predetermined quantity of time corresponding to 8.5 seconds.

15. The closed circuit television system of claim 13, wherein said predetermined quantity of time corresponds to a predetermined range of quantities of time.

16. The closed circuit television system of claim 7, said connection switching device being automatically programmed to indicate when said time-lapse recorder is recording said video images on the recording medium in a continuous mode of storing said video images during a first duration determined by a capacity of the recording medium, and when said time-lapse recorder is recording said video images on the recording medium intermittently over a second duration.

17. The closed circuit television system of claim 16, wherein said second duration is longer than said first duration.

\* \* \* \* \*